July 22, 1941.  A. V. DITTY ET AL  2,250,298
PHOTOGRAPH PROJECTOR PLATE
Filed Sept. 22, 1938  2 Sheets-Sheet 1
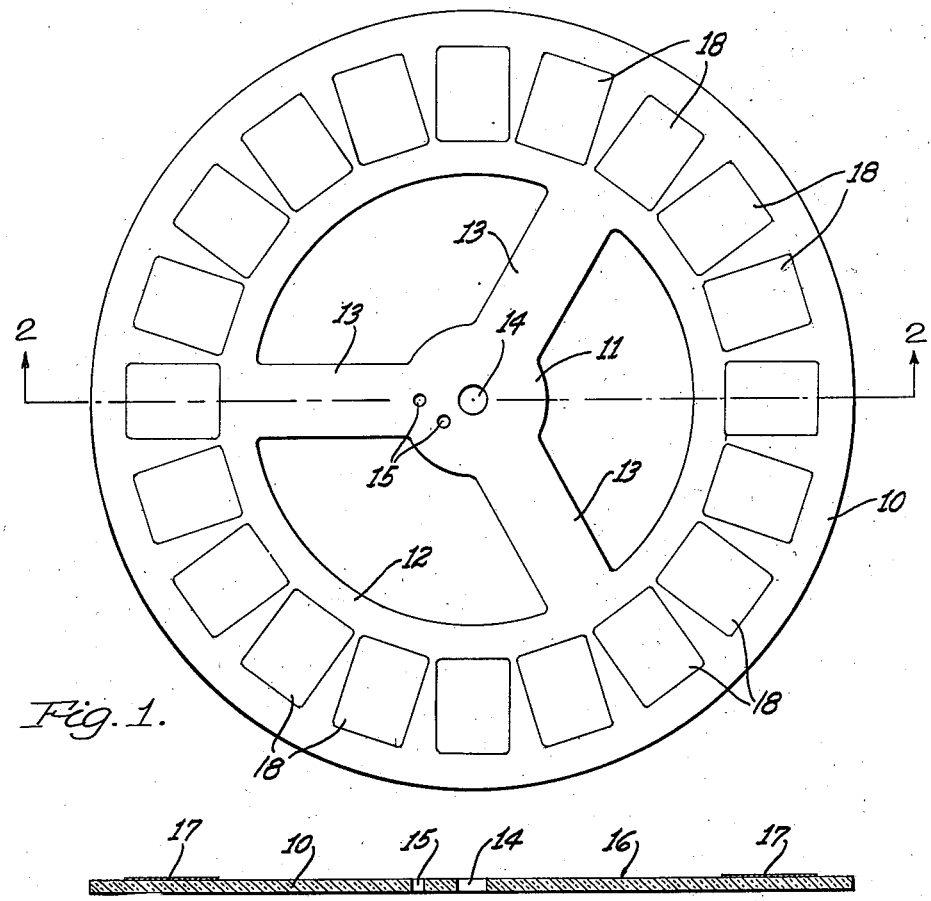
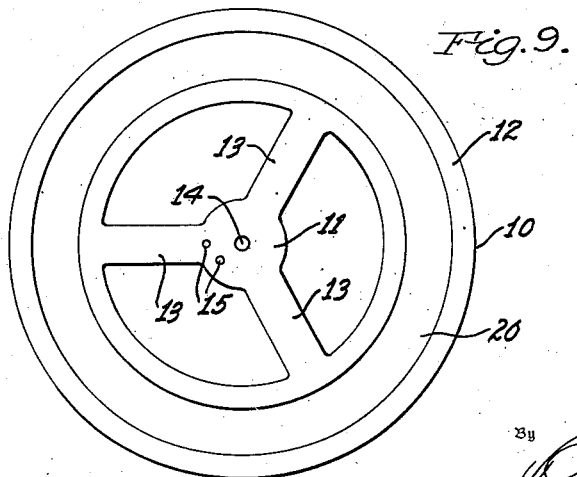

July 22, 1941.  A. V. DITTY ET AL  2,250,298
PHOTOGRAPH PROJECTOR PLATE
Filed Sept. 22, 1938  2 Sheets-Sheet 2

Inventors
Allan V. Ditty,
Arthur J. Bradford,
By
Attorneys

Patented July 22, 1941

2,250,298

UNITED STATES PATENT OFFICE 2,250,298

PHOTOGRAPH PROJECTOR PLATE

Allan V. Ditty, Detroit, and Arthur J. Bradford, Grosse Pointe Park, Mich., assignors to Motion Picture Engineering Co., Detroit, Mich., a corporation of Michigan Application September 22, 1938, Serial No. 231,177

1 Claim. (Cl. 88—27)

This invention relates generally to picture or photograph projector apparatus and more particularly to photographic projector plates.

It is an object of the present invention to provide a new and improved photographic projector plate having a plurality of different pictures arranged thereon for successive projection on a screen.

Another object of the invention is to provide a plate of the above mentioned character which will be strong and durable and easy to manufacture.

Other objects of the invention will become apparent from the following description taken in connection with the accompanying drawings in which, Figure 1 is a front elevational view of our photographic projection plate;

Fig. 2 is a sectional view of the plate, taken along the line and in the direction of the arrows 2—2 of Fig. 1;

Fig. 9 is a front elevational view of which Fig. 5 is an enlarged fragmentary view.

Figure 3:
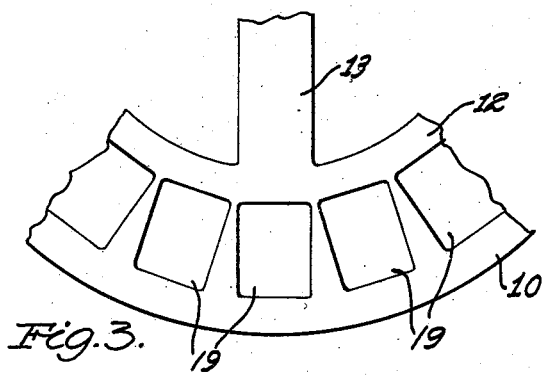
Fig. 3 is a fragmentary front elevational view of a modified plate structure.

Referring to the drawings, the plate 10 is made for use with photographic projector apparatus (not shown) for successively projecting a plurality of photographs which may be images, pictures, characters, writing, etc. onto a screen and this plate is preferably formed of a light transmitting or transparent material such as, for example, Lucite or any other suitable substantially transparent material which may be molded and is not easily broken. The plate 10 is preferably molded in the form of a circular disc and to economize on material and consequently make the disc lighter in weight it is provided with a central hub portion 11 and an outer rim or border portion 12 integrally joined to the hub portion 11 by radial spokes 13.

In the hub portion 11 is provided a centrally disposed aperture 14 to receive a drive shaft (not shown) but on which the plate is adapted to be mounted for rotation therewith. A pair of radially spaced locating apertures 15 are provided in the plate 10 to receive pins (not shown) and the apertures 15 are arranged at different distances from the axis of rotation of the plate to prevent reversal thereof or prevent a user from mounting the plate backward on the drive shaft. If desired, the pair of apertures 15 instead of being at different distances may have different diameters to correspond to a pair of different diameter locating pins.

On the rear side, as at 16, of the plate border portion 12 is provided a light sensitive emulsion 17 which may be applied to the plate along the border thereof in any suitable manner. The emulsion 17 is sensitized to provide through photographic processing a plurality of circumferentially spaced, relatively different pictures, characters, images or writings, designated by the numeral 18. In use, the plate 10 is preferably rotated to successively present the pictures or writings, as the case may be, in alignment with a lens and in the path of a beam of light to project the pictures or writing onto a screen or through a translucent screen.

Figure 4:
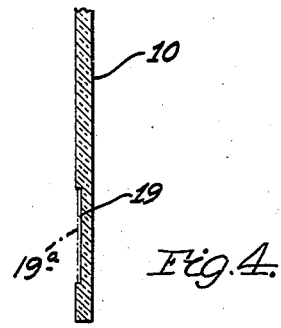
Fig. 4 is a view shown in section of the plate of Fig. 3.
Figure 5:
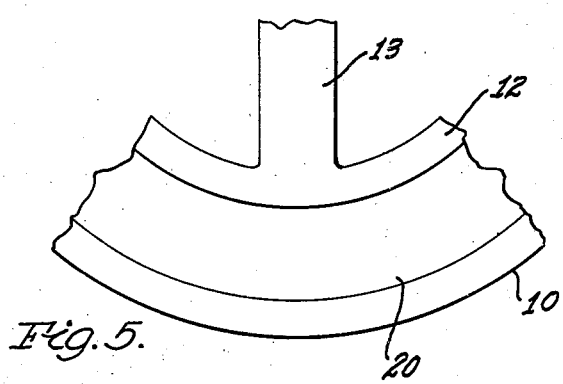
Figs. 5 and 6 show a further modified form of plate structure.
Figure 6:
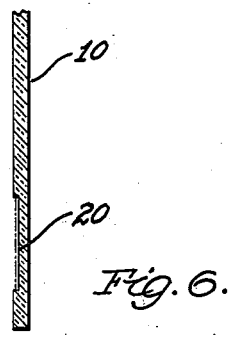

In the modification of Figs. 3 and 4 the plate 10 is provided on one or its front side with a plurality of circumferentially spaced depressions 19 along the plate border portion 12 to receive the sensitized emulsion 19a which may have its outer surface flush with or, slightly below the rear surface of the plate so that the pictures will not become scratched or otherwise marred during stacking and handling of the plates. In the modification of Figs. 5 and 6, the plate 10 is provided on one side thereof adjacent its outer periphery with a continuous circular depression 20 concentric with the axis of rotation of the plate, the depression 20 being provided to receive the emulsion which may substantially fill the depression and may have its outer surface flush with, or slightly below, the front surface of the plate. The emulsion on the plate of Figs. 5 and 6 is exposed to receive a plurality of circumferentially spaced characters, pictures, etc., not shown.

Figure 7:
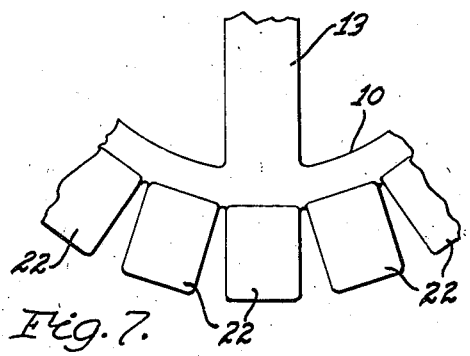
Figs. 7 and 8 show a still further modified form of plate.
Figure 8:
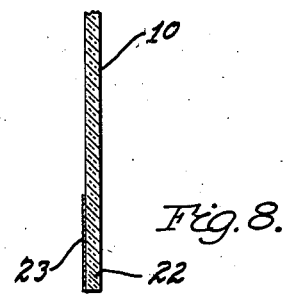

In Figs. 7 and 8, the plate 10 is formed or molded having an outer border portion comprising a plurality of equally and circumferentially spaced extended portions or tabs 22 to economize on material and each of the tabs 22 is provided with sensitized emulsion, as at 23, Fig. 8.

It will also be seen that if desired, the photographs may be taken on the usual film and then cut off and cemented onto the plates instead of applying the emulsion to the plates.

From the above description it will now be seen that we have provided new and improved photograph projection or supporting plates which are efficient in operation, easily made, such as by molding, and are strong and durable.

What we claim is:

An article of manufacture comprising, a hub portion having an axis of rotation, an outer flat rim portion, said rim portion having a continuous recess portion in one side thereof concentric with the hub axis of rotation, said recessed portion being formed of a plastic light transmitting material, photographs secured to said rim portion in said recess for projection onto a screen, circumferentially spaced spokes joining said hub portion and said rim portion together, and a pair of locating apertures in said hub portion and relatively different spaced from the axis of said hub to receive a pair of locating pins from one side only of said hub portion.

ALLAN V. DITTY.
ARTHUR J. BRADFORD.